United States Patent [19]

Cliffton et al.

[11] Patent Number: 5,071,944

[45] Date of Patent: Dec. 10, 1991

[54] PRODUCTION OF AROMATIC SULFIDE/KETONE POLYMERS

[75] Inventors: Michael D. Cliffton, Kingsport, Tenn.; Jon F. Geibel, Bartlesville, Okla.

[73] Assignee: Phillips Petroleum Company, Bartlesville, Okla.

[21] Appl. No.: 315,997

[22] Filed: Feb. 27, 1989

[51] Int. Cl.$^5$ ............................................. C08G 75/02
[52] U.S. Cl. ..................................... 528/226; 528/223; 528/224; 528/388
[58] Field of Search .................................. 528/226, 388

[56] References Cited

U.S. PATENT DOCUMENTS

| | | | |
|---|---|---|---|
| 3,800,845 | 4/1974 | Scoggin | 528/388 |
| 4,056,515 | 11/1977 | Vidaurri, Jr. | 260/79.1 |
| 4,060,520 | 11/1977 | Irvin | 260/79.1 |
| 4,066,632 | 1/1978 | Anderson et al. | 260/79.1 |
| 4,116,947 | 9/1978 | Edmonds, Jr. et al. | 528/388 |
| 4,127,713 | 11/1978 | Campbell | 528/391 |
| 4,282,347 | 8/1981 | Tieszen et al. | 528/388 |
| 4,376,196 | 3/1983 | Sherk et al. | 528/481 |
| 4,424,338 | 1/1984 | Cleary | 528/388 |
| 4,590,104 | 5/1986 | Zeiner et al. | 427/389.9 |
| 4,645,826 | 2/1987 | Jizuka et al. | 528/388 |
| 4,665,156 | 5/1987 | Reinking et al. | 528/388 |
| 4,716,212 | 12/1987 | Gaughan | 528/226 |
| 4,795,799 | 1/1989 | Cleary | 528/222 |
| 4,812,552 | 3/1989 | Cliffton et al. | 528/226 |
| 4,886,871 | 12/1989 | Satake et al. | 528/226 |

FOREIGN PATENT DOCUMENTS

| | | |
|---|---|---|
| 0210377 | 2/1987 | European Pat. Off. . |
| 0256757 | 2/1988 | European Pat. Off. . |
| 0258866 | 3/1988 | European Pat. Off. . |
| 0287009 | 10/1988 | European Pat. Off. . |
| 0293115 | 11/1988 | European Pat. Off. . |
| 62-820 | 3/1987 | Japan ................... 528/388 |

Primary Examiner—John C. Bleutge
Assistant Examiner—David W. Woodward
Attorney, Agent, or Firm—J. D. Brown

[57] ABSTRACT

A polymerization process is provided for the production of high molecular weight aromatic sulfide/ketone polymer from at least one dihaloaromatic ketone, at least one alkali metal sulfide, at least one polar organic compound and water wherein the polymerization reaction is conducted in two distinct steps separated by an intermediate step of removal of at least a portion of the water.

24 Claims, No Drawings

PRODUCTION OF AROMATIC SULFIDE/KETONE POLYMERS

This invention relates to the production of aromatic sulfide/ketone polymers. In another aspect this invention relates to the production of aromatic sulfide/ketone polymers of high molecular weight. In a further aspect, this invention relates to the production of aromatic sulfide/ketone polymers of high molecular weight in a readily controlled manner.

BACKGROUND OF THE INVENTION

Thermoplastic synthetic polymers are well known for the desirable characteristics of moldability and processing utilizing techniques which are especially suited for mass production of a wide variety of articles from such polymers. Many thermoplastic polymers however are by their very nature not useable in applications requiring relatively high use temperatures. In recent years a variety of thermoplastic polymers have been developed which can be employed at relatively high temperatures and under corrosive conditions. Such thermoplastic polymers generally have a relatively high melting or softening temperature which is directly related to the high temperature resistance of articles prepared therefrom.

A continuing problem remains in that the molecular weight of such heat resistant thermoplastic polymers is often not high enough to maintain a good balance of physical properties in the final article produced from the polymer. Thus, methods of producing such thermoplastic heat resistant polymers to an adequate degree of polymerization are still being sought.

Aromatic sulfide/ketone polymers are known in the art as having high crystalline melting points and are thus desired in applications requiring a high use temperature. Such applications include, for example, coatings for electrical wiring, automotive parts, aircraft parts, and the like. The thermoplastic aromatic sulfide/ketone polymers are also especially useful in applications wherein they are reinforced with heat resistant fibers, filaments or fillers to provide heat resistant composite structures. Such composite materials comprising the aromatic sulfide/ketone polymers show toughness as well as good heat distortion resistance and resistance to a variety of commonly encountered solvents.

It is an object of our invention to provide a process for producing aromatic sulfide/ketone polymers. It is a further object of our invention to provide a process for producing aromatic sulfide/ketone polymers of high molecular weight. It is a still further object of our invention to provide a simple and readily controllable process for producing aromatic sulfide/ketone polymers of high molecular weight.

BRIEF STATEMENT OF THE INVENTION

According to our invention a process is provided for the production of an aromatic sulfide/ketone polymer which comprises (A) contacting:
(1) at least one dihaloaromatic ketone,
(2) at least one polar organic compound,
(3) at least one alkali metal sulfide, and
(4) water under polymerization conditions of temperature and time sufficient to form a first polymerization reaction mixture wherein the water content is about 2 to about 20 weight percent based on the weight of said polar organic compound;

(B) heating said first polymerization reaction mixture under conditions of time and temperature sufficient to remove water from said first polymerization reaction mixture such that the amount of water remaining in said first polymerization reaction mixture is less than the amount employed in (A) and is about 0.1 to about 10 weight percent based on the weight of said polar organic compound; and (C) subjecting said first polymerization reaction mixture to polymerization conditions of temperature and time sufficient to form a second polymerization reaction mixture comprising said aromatic sulfide/ketone polymer.

DETAILED DESCRIPTION OF THE INVENTION

Preferred dihaloaromatic ketones that can be employed in the process of our invention can be represented by the formula:

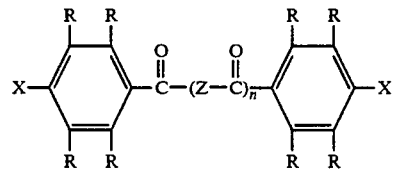

where each X is selected from the group consisting of fluorine, chlorine, bromine, and iodine; Z is a divalent radical selected from the group consisting of

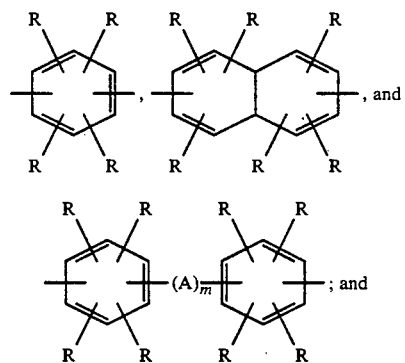

n is 0 or 1; m is 0 or 1; A is selected from the group consisting of oxygen, sulfur, carbonyl, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

Our process more preferably employs a dihalobenzophenone of the formula:

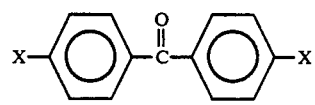

wherein X is defined as above.

Examples of suitable dihaloaromatic ketones which can be employed in the process of our invention include 4,4'-dichlorobenzophenone, 4,4'-difluorobenzophenone, 4,4'-dibromobenzophenone, 4,4'-diiodobenzophenone, 4-chloro-4'-fluorobenzophenone, 1,4-bis-(4-fluorobenzoyl)-benzene, 1,4-bis-(4-chlorobenzoyl)-benzene, 1-(4-chlorobenzoyl)-4-(4-fluorobenzoyl)-benzene, bis[4-(4-chlorobenzoyl)phenyl]thioether, bis(2,3,5,6-tetramethyl-4-chlorophenyl)ketone, bis[4-(4-chlorobenzoyl)phenyl]ether, 4,4'-bis-(4-chlorobenzoyl)-biphenyl, and the like and mixtures of any two or more thereof. The presently most preferred dihaloaromatic ketone is 4,4'-dichlorobenzophenone because of its effectiveness and commercial availability.

In our invention the amount of dihaloaromatic ketone employed depends upon the amount of alkali metal sulfide employed but generally these compounds will both be present in about equal molar proportions. The preferred molar ratio of dihaloaromatic ketone to the alkali metal sulfide is about 0.95:1 to about 1.05:1.

The polar organic compounds which can be used in the method of our invention for the production of aromatic sulfide/ketones includes amides and sulfones. Examples include hexamethyl phosphoramide, tetramethylurea, N,N'-ethylenedipyrrolidone, 1,3-dimethyl-2-imidazolidinone, N-methyl-2-pyrrolidone (NMP), pyrrolidone, caprolactam, N-ethylcaprolactam, sulfolane, N,N'-dimethylacetamide, diphenylsulfone, and the like, and mixtures thereof. The preferred polar organic compound because of effectiveness and commercial availability is NMP.

The molar ratio of polar organic compound to alkali metal sulfide used in our invention is generally about 4:1 to about 36:1, preferably about 8:1 to about 24:1.

The alkali metal sulfides that can be employed according to our invention include lithium sulfide, sodium sulfide, potassium sulfide, rubidium sulfide, cesium sulfide, and mixtures thereof.

If desired, the alkali metal sulfide can be prepared by the reaction of hydrogen sulfide with about twice the molar amount of an alkali metal hydroxide. The alkali metal sulfide can also be prepared by the reaction of an alkali metal hydrosulfide with an alkali metal hydroxide generally conducted in an aqueous medium. Suitable alkali metal hydroxides that can be employed to prepare the alkali metal sulfides according to these embodiments include lithium hydroxide, sodium hydroxide, potassium hydroxide, rubidium hydroxide, cesium hydroxide, and mixtures thereof. Suitable alkali metal hydrosulfides include lithium hydrosulfide, sodium hydrosulfide, potassium hydrosulfide, rubidium hydrosulfide, cesium hydrosulfide and mixtures thereof.

It is preferred to employ the combination of alkali metal hydrosulfide with alkali metal hydroxide according to our invention since, as disclosed in U.S. Pat. No. 4,716,212 of Gaughan, a controlled excess of alkali metal hydrosulfide with respect to alkali metal hydroxide can serve to control the inherent viscosity of the aromatic sulfide/ketone produced. More preferably, our invention employs a mole percent excess of alkali metal hydrosulfide with respect to alkali metal hydroxide of about 0.5 to about 2.0. Sodium hydrosulfide and sodium hydroxide are preferred reaction components according to our invention because of good results obtained and ready availability.

According to our invention, the beneficial effects of water on the polymerization process to form the aromatic sulfide/ketone polymer are maximized by conducting the polymerization process in two distinct steps separated by an intermediate step wherein water is removed from the first polymerization reaction mixture comprising a lower molecular weight aromatic sulfide/ketone polymer to provide an optimized amount of water for the final step of the polymerization reaction to form a higher molecular weight aromatic sulfide/ketone polymer.

The amount of water utilized in the first polymerization step wherein a lower molecular weight aromatic sulfide/ketone polymer is formed is about 2 to about 20, preferably about 5 to about 10, and more preferably about 6 to about 8 weight percent based on the weight of the polar organic compound. This amount is believed to provide a rapid polymerization to produce the intermediate lower molecular weight aromatic sulfide/ketone polymer.

The polymerization conditions employed in the first polymerization step to prepare the first polymerization reaction mixture can vary widely but will generally include a temperature within the range of about 175° C. to about 350° C., preferably about 225° C. to about 275° C. The reaction time can also vary widely depending in part on the reaction temperature employed but generally will be within the range of about ten minutes to about 72 hours, preferably about one hour to about 20 hours. The pressure employed should be sufficient to maintain said first polymerization reaction mixture substantially in the liquid phase. The pressure will generally be in the range of about 0 psig to about 400 psig, preferably about 150 psig to about 250 psig.

The first polymerization reaction mixture comprising the lower molecular weight aromatic sulfide/ketone polymer can optionally be cooled below the boiling temperature of the polymerization reaction mixture which for practical purposes is below or at the boiling temperature of the polar organic compound. The optionally cooled first polymerization reaction mixture is then heated under conditions of time and temperature sufficient to remove by suitable means at least a portion of the water such that the amount of water remaining is about 0.1 to about 10 weight percent based on the weight of the polar organic compound. Suitable means for water removal can include a distillation column attached to the vessel containing the first polymerization reaction by a suitable valve system. For convenience, this water removal step is referred to hereinafter as dehydration and the mixture from which water is removed is referred to as dehydrated.

The amount of water remaining in the dehydrated first polymerization reaction mixture can be determined by any convenient means. One suitable means is to apply a gas/liquid phase chromatographic (GLC) analysis to a sample of the first polymerization reaction mixture. GLC analysis is well known to those of ordinary skill in the art and suitable conditions including temperature, column type, and standards can readily be determined in a few preliminary experiments.

It is often convenient to conduct a "complete" dehydration of the first polymerization reaction mixture, i.e. essentially all of the water is removed except for water which is consumed by reaction with alkali metal sulfide and NMP in forming a complex from these components. However, if a "complete" dehydration is conducted on the first polymerization reaction mixture, it will generally be necessary to add water back to the system in order to achieve the desired amount of water for the second polymerization reaction step. The reason why water may need to be added back is that although the amount of water desired for the second polymerization step is lower than that employed in the first polymerization step, we have found that if the amount of water is too low in the second polymerization step poor results are obtained. Specifically, the polymer coats the reactor and stirrer surfaces rather than remaining in a dispersed or dissolved state in the liquid phase. This polymer coating not only seriously impairs needed heat transfer for the reaction vessel but also appears to drastically slow polymer chain growth such that high molecular weight polymer is not obtained in a reasonable reaction period.

If it is necessary to add water back to the dehydrated first polymerization reaction mixture, the water can be charged directly to said dehydrated first polymerization reaction mixture by any means capable of adding the water to the vessel which is under the pressure obtained at the end of the dehydration step.

The dehydrated first polymerization reaction mixture containing the desired amount of water is then subjected to further reaction conditions of temperature and time sufficient to produce a second polymerization reaction mixture. These conditions will generally include a temperature within the range of about 175° C. to about 350° C., preferably about 225° C. to about 275° C. The reaction time can also vary widely depending in part on the reaction temperature employed but generally will be within the range of about ten minutes to about 72 hours, preferably about one hour to about 20 hours. The pressure employed should be sufficient to maintain said second polymerization reaction mixture substantially in the liquid phase. The pressure will generally be in the range of about 0 psig to about 400 psig, preferably about 150 psig to about 250 psig.

The aromatic sulfide/ketone polymers produced by the process of our invention can be recovered from the polymerization reaction mixture in particulate form employing any convenient method. For example, the reaction mixture can be diluted with water or a mixture of water with polar organic compound and the resulting particulate aromatic sulfide/ketone polymer separated from this mixture by filtration. The recovered polymer is generally washed with water at least once and preferably several times with at least a portion of the washing being conducted at elevated temperature. A preferred recovery procedure includes a washing step in which the polymer is treated in the presence of an aqueous solution of a calcium salt, e.g. calcium acetate or calcium chloride, prior to a final washing with water.

The aromatic sulfide/ketone polymer produced according to our invention, having a high molecular weight, can be employed to make molded articles, fibers, film and the like as well as being employed in the production of fiber reinforced composites all of which exhibit heat distortion resistance characteristic of this high melting partially crystalline thermoplastic polymer.

EXAMPLES

Examples are provided in an effort to assist one skilled in the art to a further understanding of our invention, and yet not be unduly limitative of the reasonable scope of our invention. The particular reactants, conditions, ratios, and the like, are all intended to be illustrative of our invention, and not limitative of the reasonable and suitable scope thereof.

A two-gallon Magnadrive stirred stainless steel reactor manufactured by Autoclave Engineers, Inc. was used for the polymerization runs. In a typical polymerization, 2.01 moles of NaSH.2.15H$_2$O, 2.00 moles of NaOH, 2.00 moles of 4,4'-dichlorobenzophenone and 24.84 moles of N-methyl-2-pyrrolidone (NMP) were charged to the reactor. After purging the system with nitrogen the contents were heated to 250° C. and held for one hour. The reactor was cooled to 160° C. and water was distilled out through a condenser fitted to the reactor. During this dehydration the temperature was gradually increased to 200° C. This was followed by charging the desired amount of water if needed into the reactor from a stainless steel pressure vessel. The reactor contents were heated to 250° C. and held for two hours. Polymerization was completed at 270° C. for ½ hour, then allowed to cool over night.

In a typical recovery procedure the polymer product was suspended in tap water and collected by filtration. Following three cold water washings the polymer was washed with 1 weight percent aqueous NaOH at 120° C. and filtered. After a cold water wash the polymer was washed in 5 weight percent aqueous calcium chloride at 185° C. for ½ hour. Finally, the filtered polymer was given several cold water washings and dried in a forced air oven at 100° C. for 6 hours. The polymer yield was generally about 94 percent of theoretical.

Inherent viscosity (IV) was determined on samples of dried polymer in concentrated sulfuric acid at 30° C. at a polymer concentration of 0.5 gram/deciliter (g/dL) utilizing a #200 Cannon-Fenske Routine viscometer.

Melt flow rates were determined according to ASTM Method D 1238-85 Procedure B—Automatically Time Flow Rate Measurement under Condition 372/5.0 modified to employ a 5 minute preheat time and with the results being reported in units of grams/10 minutes.

EXAMPLE I

Runs were conducted according to our invention for the polymerization of 4,4'-dichlorobenzophenone (DCBP) in the presence of NaSH.2.15 H$_2$O, NaOH and NMP to prepare poly(phenylene sulfide/ketone) (PPSK). The recipe employed for these runs is shown below.

| Recipe | |
|---|---|
| | Amount, Moles |
| DCBP | 2.00 |
| NaOH | 2.00 |
| NaSH.2.15 H$_2$O | Variable |
| NMP | 24.84 |
| H$_2$O (added after dehydration) | 2.00 |
| Polymerization - Step 1 | |
| Temperature, °C. | 250 |
| Time, hr | 1 |
| Dehydration | |
| Temperature, °C. start: | 120–200 |
| finish: | 200–205 |
| Time, hr about | 0.75–1 |
| Polymerization - Step 2 | |
| Temperature, °C. | 250, 270 |
| Time, hr | 2, 0.5 |

The results obtained in these runs are presented below in Table I.

TABLE I

| Run No. | NaSH Moles | H$_2$O[a] Moles | Melt Flow g/10 min. | H$_2$O[e] wt % |
|---|---|---|---|---|
| 1 | 2.01 | 4.32 | 148 | 2.9 |
| 2 | 2.02 | 4.34 | 117 | 2.9 |
| 3 | 2.03 | 4.36 | ND[b] | 2.9 |
| 4 | 2.03 | 4.36 | 30[c] | 2.9 |
| 5 | 2.03 | 4.36 | — | 2.9 |

TABLE I-continued

| Run No. | NaSH Moles | $H_2O^{(a)}$ Moles | Melt Flow g/10 min. | $H_2O^{(e)}$ wt % |
|---|---|---|---|---|
| 6 | 2.03 | 4.36 | — | 2.9 |
| 7(d) | 2.03 | 4.36 | 58 | 3.6 |
| 8 | 2.04 | 4.39 | 5 | 3.0 |

(a)Water from initial charge of NaSH.2.15 $H_2O$.
(b)ND indicates not determined.
(c)Determined on a blend of Runs 4–6.
(d)This run used 20.70 moles NMP.
(e)Calculated weight percent $H_2O$, after addition of $H_2O$ following dehydration, based on weight of NMP.

The results shown in Table I demonstrate that the two-step polymerization procedure with adjustment of water content of our invention can produce PPSK of low melt flow rate (high molecular weight) and that melt flow rate can be effectively controlled by the amount of excess NaSH relative to the NaOH charged to the initial polymerization reaction mixture.

EXAMPLE II

A comparative run (Run 9) was carried out for the preparation of PPSK which did not utilize the two-step polymerization procedure with adjustment of water content but which did employ a larger excess of NaSH than any of the runs of Example I. The recipe employed in Run 9 is shown below.

| Recipe | Amount, Moles |
|---|---|
| DCBP | 2.00 |
| NaOH | 2.00 |
| NaSH.2.15 $H_2O$ | 2.08 |
| NMP | 24.84 |
| Polymerization | |
| Temperature, °C. | 250, 270 |
| Time, hr | 3, 0.5 |

In this run the two gallon reactor was charged with the recipe ingredients, purged with nitrogen, stirred at 250 rpm, heated at 250° C. for 3 hours then at 270° C. for 0.5 hour. The reaction mixture was cooled, filtered and the solids charged to another two gallon vessel for washing with 3,000 mL deionized water containing 30 g NaOH. The vessel was purged with nitrogen then heated to 120° C. then cooled. The mixture was filtered and polymer solids charged back to the two gallon vessel for washing with 3,000 mL deionized water containing 150 g $CaCl_2$. The vessel was purged with nitrogen and heated to 185° C. and held at 185° C. for 0.5 hour. The mixture was cooled, filtered and the polymer washed with water then with acetone. The polymer was dried in a forced air oven to provide 392.6 g of polymer.

Samples of the polymer were analyzed for melt flow and inherent viscosity. Melt flow was zero (0) while inherent viscosity was 0.81 dL/g. Even though the inherent viscosity value was quite high the polymer was believed to be somewhat unstable in the melt which was believed to be related to the high level of NaSH employed.

EXAMPLE III

Two additional comparative runs (Runs 10, 11) were conducted which employed a two-step polymerization procedure with an intermediate "complete" dehydration but with no water added back after the dehydration step.

The recipe employed in these runs is presented below and the results are given in Table II.

| Recipe | Amount, Moles |
|---|---|
| DCBP | 2.00 |
| NaOH | 2.00 |
| NaSH.2.15 $H_2O$ | Variable |
| NMP | 24.84 |
| Polymerization - Step 1 | |
| Temperature, °C. | 250 |
| Time, hr | 1 |
| Dehydration | |
| Temperature, °C. start: about | 200 |
| finish: | 200 |
| Time, hr about | 0.75–1 |
| Polymerization - Step 2 | |
| Temperature, °C. | 250, 270 |
| Time, hr | 2, 0.5 |

The polymer products were recovered, washed and dried as described in Example II above except that Run 10 did not employ the NaOH and $CaCl_2$ wash steps.

TABLE II

| Run No. | NaSH Moles | $H_2O^{(a)}$ Moles | $H_2O^{(b)}$ wt % | Melt Flow g/10 Min. | Inherent Viscosity dL/g |
|---|---|---|---|---|---|
| 10 | 2.08 | 4.47 | 1.5 | 0 | 0.30 |
| 11 | 2.04 | 4.39 | 1.5 | $ND^{(c)}$ | 0.61 |

(a)Water from initial charge of NaSH.2.15 $H_2O$.
(b)Calculated weight percent water, after dehydration, based on weight of NMP.
(c)ND indicates not determined.

In Run 10, 405.6 g of dried polymer was obtained while Run 11 gave 405 g of dried polymer.

In both Runs 10 and 11 there was observed a coating of polymer on the walls of the reactor and on the stirrer blades when the reactor was opened after the final polymerization step. This polymer coating was believed to significantly impede heat transfer during the polymerization and also to hinder the achievement of higher molecular weight polymer.

That which is claimed is:

1. A method for preparing a poly(arylene sulfide ketone) comprising:
   a) contacting at least one polar organic compound, at least one dihaloaromatic ketone, at least one alkali metal sulfide, and water under polymerization conditions effective for producing a first polymerization reaction mixture comprising poly(arylene sulfide ketone) wherein said water is present in an amount of about 2 to about 20 weight percent based on the weight of said at least one polar organic compound;
   b) heating said first polymerization reaction mixture under conditions sufficient to remove water and produce a dehydrated first polymerization reaction mixture wherein the amount of water remaining is less than the amount employed in a) and is about 0.1 to about 10 weight percent based on the weight of said at least one polar organic compound;
   c) subjecting said dehydrated first polymerization reaction mixture to polymerization conditions effective for producing a second polymerization reaction mixture comprising said poly(arylene sulfide ketone).

2. A method according to claim 1 wherein the molar ratio of said at least one dihaloaromatic ketone to said at least one alkali metal sulfide is about 0.90:1 to about 1.05:1.

3. A method according to claim 2 wherein the molar ratio of said at least one polar organic compound to said at least one alkali metal sulfide is about 4:1 to about 36:1.

4. A method according to claim 3 wherein said polymerization conditions employed for the production of said first polymerization reaction mixture utilize a temperature of about 150° C. to about 400° C. and a time of about 10 minutes to about 72 hours.

5. A method according to claim 4 wherein said heating of said first polymerization reaction mixture employs a temperature of about 150° C. to about 400° C.

6. A method according to claim 5 wherein said polymerization conditions employed for the production of said second polymerization reaction mixture utilize a temperature of about 150° C. to about 400° C. and a time of about 10 minutes to about 72 hours.

7. A method according to claim 6 wherein said at least one dihaloaromatic ketone is selected from the group consisting of 4,4'-dichlorobenzophenone, 1,4-bis-(4-chlorobenzoyl)-benzene, and 4,4'-bis-(4-chlorobenzoyl)-biphenyl.

8. A method according to claim 7 wherein said at least one alkali metal sulfide is selected from the group consisting of sodium sulfide, potassium sulfide, lithium sulfide, and rubidium sulfide, and cesium sulfide.

9. A method according to claim 8 wherein said polar organic compound is selected from the group consisting of amides and sulfones.

10. A method according to claim 9 wherein said polar organic compound is selected from the group consisting of N-methyl-2-pyrrolidone, 1,3-dimethyl-2-imidazolidinone, N-ethylcaprolactam, N-methylcaprolactam, sulfolane and diphenylsulfone.

11. A method according to claim 10 wherein said dihaloaromatic ketone is 4,4'-dichlorobenzophenone, said alkali metal sulfide is sodium sulfide, and said polar organic compound is N-methyl-2-pyrrolidone.

12. A method according to claim 1 wherein said first polymerization reaction mixture produced in a) is cooled to a temperature of about 75° C. to about 240° C. prior to b).

13. A method according to claim 12 wherein said heating of said first polymerization reaction mixture employs a temperature of about 150° C. to about 400° C. and wherein said polymerization conditions employed for the production of said first and second polymerization reaction mixtures utilize a temperature of about 150° C. to about 400° C. and a time of about 10 minutes to about 72 hours.

14. A method according to claim 13 wherein said at least one dihaloaromatic ketone is selected from the group consisting of 4,4'-dichlorobenzophenone, 1,4-bis-(4-chlorobenzoyl)-benzene, and 4,4'-bis-(4-chlorobenzoyl)-biphenyl and wherein said alkali metal sulfide is selected from the group consisting of sodium sulfide, potassium sulfide, lithium sulfide, rubidium sulfide and cesium sulfide.

15. A method according to claim 14 wherein said polar organic compound is selected from the group consisting of amides and sulfones.

16. A method according to claim 15 wherein said polar organic compound is selected from the group consisting of N-methyl-2-pyrrolidone, 1,3-dimethyl-2-imidazolidinone, N-ethylcaprolactam, N-methylcaprolactam, sulfolane and diphenylsulfone.

17. A method according to claim 16 wherein said dihaloaromatic ketone is 4,4'-dichlorobenzophenone, said alkali metal sulfide is sodium sulfide, and said polar organic compound is N-methyl-2-pyrrolidone.

18. A method for preparing a poly(arylene sulfide ketone) comprising:
   a) contacting at least one polar organic compound, at least one dihaloaromatic ketone, at least one alkali metal sulfide, and water under polymerization conditions effective for producing a first polymerization reaction mixture comprising poly(arylene sulfide ketone) wherein said water is present in an amount of about 2 to about 20 weight percent based on the weight of said at least one polar organic compound;
   b) heating said first polymerization reaction mixture under conditions sufficient to remove essentially all unreacted water and produce a dehydrated first polymerization reaction mixture;
   c) adding sufficient water to said dehydrated first polymerization reaction mixture such that the amount of water present in said dehydrated first polymerization reaction mixture is less than the amount employed in a) and is about 0.1 to about 10 weight percent based on the weight of said at least one polar organic compound;
   d) subjecting said dehydrated first polymerization reaction mixture obtained from c) to polymerization conditions effective for producing a second polymerization reaction mixture comprising said poly(arylene sulfide ketone).

19. A method according to claim 18 wherein said first polymerization reaction mixture produced in a) is cooled to a temperature of about 75° C. to about 240° C. prior to b).

20. A method according to claim 18 wherein said heating of said first polymerization reaction mixture employs a temperature of about 150° C. to about 400° C. and wherein said polymerization conditions employed for the production of said first and said second polymerization reaction mixtures utilize a temperature of about 150° C. to about 400° C. and a time of about 10 minutes to about 72 hours.

21. A method according to claim 20 wherein said at least one dihaloaromatic ketone is selected from the group consisting of 4,4'-dichlorobenzophenone, 1,4-bis-(4-chlorobenzoyl)-benzene, and 4,4'-bis-(4-chlorobenzoyl)-biphenyl and wherein said alkali metal sulfide is selected from the group consisting of sodium sulfide, potassium sulfide, lithium sulfide, rubidium sulfide, and cesium sulfide.

22. A method according to claim 21 wherein said polar organic compound is selected from the group consisting of amides and sulfones.

23. A method according to claim 22 wherein said polar organic compound is selected from the group consisting of N-methyl-2-pyrrolidone, 1,3-dimethyl-2-imidazolidinone, N-ethylcaprolactam, N-methylcaprolactam, sulfolane and diphenylsulfone.

24. A method according to claim 23 wherein said dihaloaromatic ketone is 4,4'-dichlorobenzophenone, said alkali metal sulfide is sodium sulfide, and said polar organic compound is N-methyl-2-pyrrolidone.

* * * * *